(12) United States Patent
Nagy

(10) Patent No.: US 9,700,977 B2
(45) Date of Patent: Jul. 11, 2017

(54) MOTOR DRIVEN MACHINE TOOL

(75) Inventor: Attila Nagy, Miskolc-Szirma (HU)

(73) Assignee: Robert Bosch GmbH, Stuttgart (DE)

( * ) Notice: Subject to any disclaimer, the term of this patent is extended or adjusted under 35 U.S.C. 154(b) by 578 days.

(21) Appl. No.: 14/344,624

(22) PCT Filed: Sep. 3, 2012

(86) PCT No.: PCT/EP2012/067087
§ 371 (c)(1),
(2), (4) Date: Oct. 2, 2014

(87) PCT Pub. No.: WO2013/037653
PCT Pub. Date: Mar. 21, 2013

(65) Prior Publication Data
US 2015/0021061 A1    Jan. 22, 2015

(30) Foreign Application Priority Data
Sep. 15, 2011 (DE) .......................... 10 2011 082 787

(51) Int. Cl.
*B23Q 3/157* (2006.01)
*B25F 1/04* (2006.01)
(Continued)

(52) U.S. Cl.
CPC ..... *B23Q 3/15766* (2013.01); *B23Q 3/15526* (2013.01); *B25B 21/00* (2013.01);
(Continued)

(58) Field of Classification Search
CPC ......... Y10T 483/1755; Y10T 483/1757; Y10T 483/1774; Y10T 483/1779;
(Continued)

(56) References Cited

U.S. PATENT DOCUMENTS

| 4,448,098 A | 5/1984 | Totsu |
|---|---|---|
| 4,604,005 A | 8/1986 | Russ |

(Continued)

FOREIGN PATENT DOCUMENTS

| CN | 101563192 A | 10/2009 |
|---|---|---|
| CN | 102114623 A | 7/2011 |

(Continued)

OTHER PUBLICATIONS

International Search Report corresponding to PCT Application No. PCT/EP2012/067087, mailed Oct. 4, 2012 (German and English language document) (7 pages).

*Primary Examiner* — Sunil K Singh
*Assistant Examiner* — Michael Vitale
(74) *Attorney, Agent, or Firm* — Maginot, Moore & Beck LLP

(57) ABSTRACT

A motor-driven machine tool includes a drive unit and a tool changing magazine with tool chambers that are placed into a transfer position adjacent to a tool receptacle to be loaded. The machine tool includes a tool changing device with a slide element that is arranged in operative connection with a tool. The slide element is moved by an operating element into a first position for accepting a tool from or transferring a tool to the tool chamber and into a second position to drive the tool. The slide element is fixed in the second position by a blocking element that is brought out of operative connection with the slide element by a transfer element to move the slide element from the second position to the first position. The slide element is arranged in indirect contact with the blocking element to move the blocking element by the transfer element.

18 Claims, 3 Drawing Sheets

(51) Int. Cl.
*B23Q 3/155* (2006.01)
*B25F 5/02* (2006.01)
*B25B 21/00* (2006.01)
*B25B 23/00* (2006.01)

(52) U.S. Cl.
CPC ............ *B25B 23/0035* (2013.01); *B25F 1/04* (2013.01); *B25F 5/029* (2013.01); *Y10T 483/1755* (2015.01); *Y10T 483/1798* (2015.01); *Y10T 483/1827* (2015.01)

(58) Field of Classification Search
CPC ........... Y10T 483/1783; Y10T 483/179; Y10T 483/1798; Y10T 483/1818; Y10T 483/1827; B23Q 3/15766; B25F 5/029
USPC ........ 483/39, 40, 47, 49, 51, 54, 57, 60, 61; 81/177.4, 439, 490
See application file for complete search history.

(56) References Cited

U.S. PATENT DOCUMENTS

| | | | |
|---|---|---|---|
| 5,022,131 A | | 6/1991 | Hobbs |
| 5,065,498 A | * | 11/1991 | McKenzie ......... B23Q 3/15526 |
| | | | 408/35 |
| 5,346,453 A | | 9/1994 | Rivera-Bottzeck |
| 5,597,275 A | | 1/1997 | Hogan |
| 5,893,685 A | * | 4/1999 | Olson .................... B25F 5/029 |
| | | | 408/124 |
| 8,007,424 B2 | * | 8/2011 | Moser .................... B25B 21/00 |
| | | | 408/35 |

FOREIGN PATENT DOCUMENTS

| | | | |
|---|---|---|---|
| DE | 100 13 984 A1 | 9/2001 | |
| DE | 10045617 A1 * | 4/2002 | ............ B23B 31/00 |
| DE | 10 2006 059 688 A1 | 6/2008 | |
| DE | WO 2008074536 A1 * | 6/2008 | ............ B25B 21/00 |

* cited by examiner

MOTOR DRIVEN MACHINE TOOL

This application is a 35 U.S.C. §371 National Stage Application of PCT/EP2012/067087, filed on Sep. 3, 2012, which claims the benefit of priority to Serial No. DE 10 2011 082 787.0, filed on Sep. 15, 2011 in Germany, the disclosures of which are incorporated herein by reference in their entirety.

BACKGROUND

The disclosure relates to a motor-powered power tool.

A power tool of this type is known from the applicant's DE 10 2006 059 688 A1. The known power tool has a tool change magazine having tool chambers for in each case one tool, which is arranged in a rotatable manner on an axis within the housing of the power tool, wherein the tool chambers are each adjustable into a position for transferring to a tool receptacle, to be equipped, of the power tool. A tool is transferred from a tool chamber into the tool receptacle and, respectively, from the tool receptacle back into a tool chamber by means of a slider element, which is formed for example in a magnetic manner on the side facing the tool. What is essential in this case is that the slider element, in the operating position of the power tool, in which the tool located in the tool receptacle is driven for example in order to screw in a screw, the tool can be supported on the slider element, and so the slider element forms a support for the tool. To this end, provision is made in the prior art for the slider element to be fixable by means of a locking mechanism. The locking mechanism is actuated by means of a separate operating element, which is distinct from the operating element for actuating the slider element. Thus, in order to initiate a tool change, it is necessary to actuate two operating elements, for which purpose an operator has to use both hands: with one hand, the securing mechanism of the slider element is deactivated via one operating element, while with the other hand, with the securing mechanism deactivated, the other operating element actuates the slider element and transfers the tool out of the tool receptacle into the corresponding tool chamber of the tool change magazine.

SUMMARY

Proceeding from the illustrated prior art, the disclosure is based on the problem of developing a motor-powered power tool such that a tool change is simplified to such an extent that only a single operating element is necessary in order to carry out a tool change. This has the advantage that an operator requires only one hand for a tool change, and so the other hand can be used for example very easily to support the power tool during the tool change. This problem is solved according to the disclosure, in the case of a power tool having the features of disclosure, in that the slider element is arranged in at least indirect contact with the blocking element in order to adjust the blocking element by means of the transmission element. In particular, the transmission element is operatively connected to the operating element in order to adjust from the second position into the first position.

The solution according to the disclosure has the advantage that only a single, manually actuable operating element is necessary for a tool change. By means of the one operating element, the power tool can be adjusted from the operating position (second position) into the non-operating position (first position). The single operating element has in this case a double function: firstly of adjusting the slider element from the second position into the first position, and secondly of taking the blocking element out of operative connection with the slider element (unlocking the blocking element). In particular, a separate operating element for unlocking the blocking element is not necessary. This makes it in particular possible to operate the power tool with one hand.

Advantageous developments of the power tool according to the disclosure are given in the dependent claims. All combinations of at least two features disclosed in the claims, the description and/or the figures are included in the scope of the disclosure.

In a preferred structural configuration of the disclosure, it is proposed that the blocking element has an end region facing the slider element, said end region bearing in the second position against the slider element, preferably against that end side of the slider element that faces the blocking element.

In order to allow the slider element to move in order to transfer a tool out of the tool receptacle, provision is furthermore made in the last-mentioned variant for, in order to adjust from the second position into the first position and vice versa, the blocking element to be arranged so as to be changeable in position, such that in the first position at least the end region of the blocking element is arranged in a plane below or above the slider element.

A configuration of the blocking element in which the latter has a pin-shaped region that serves for locking the slider element, and preferably is arranged in a pivotable manner on a pivot on the side opposite the end region, is very particularly preferred.

A particularly compact design of the power tool in the region of the tool change device is achieved when the pin-shaped region of the blocking element is oriented parallel to the slider element in the first position, such that the slider element is arranged alongside the pin-shaped region of the blocking element.

The actual adjustment of the blocking element is achieved in that the operating element is arranged in a longitudinally displaceable manner in a direction parallel to the drive axis of the tool receptacle and has a transmission element which interacts at least indirectly with the blocking element.

In order to effect a pivoting of the blocking element, provision is furthermore made for an end region, preferably remote from the slider element, of the transmission element to interact with a switching element arranged on the blocking element in order to adjust the blocking element, wherein the end region and/or the switching element have mutually facing contact surfaces that interact with one another and are arranged obliquely with respect to the drive axis of the tool receptacle and, when moving past one another, produce a force on the blocking element, said force effecting an adjustment of the blocking element from the second position into the first position.

In order to allow the slider element to move past the switching element so as to allow a design of the tool change device which is as compact as possible, it is furthermore proposed that the switching element is arranged in an approximately central region of the pin-shaped blocking element and has a cutout, preferably in the form of an aperture, through which the slider element is guidable as it moves between the two positions.

In order to effect a secure and defined position of the blocking element in the second position of the slider element, it is furthermore proposed that the blocking element interacts in operative connection with a restoring element preferably in the form of a compression spring, which subjects the blocking element to a force in order to move it in the direction of the first position.

In order to separate the movements of the operating element for adjusting the blocking element on the one hand and for adjusting the slider element on the other hand, it is furthermore proposed in a structurally preferred configuration that the operating element is arranged in a guide plate which has a longitudinal slot having two end stops, within which the operating element is movable into the second position along a displacement path in order to adjust the blocking element.

BRIEF DESCRIPTION OF THE DRAWINGS

Further advantages, features and details of the disclosure can be gathered from the following description of preferred exemplary embodiments and from the drawings, in which.

DETAILED DESCRIPTION

Identical components or components having an identical function are provided with identical reference signs in the figures.

Figure 1:
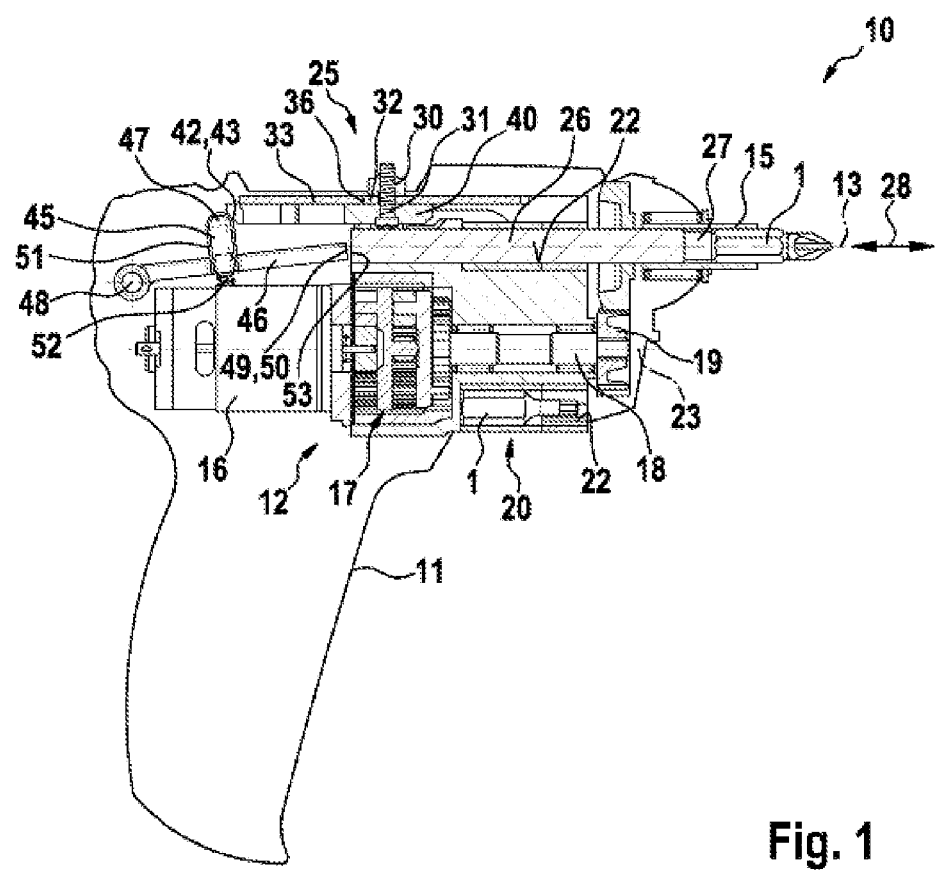
FIG. 1 shows a power tool according to the disclosure during its normal operation for driving a tool in a tool receptacle in a simplified longitudinal section.
Figure 2:
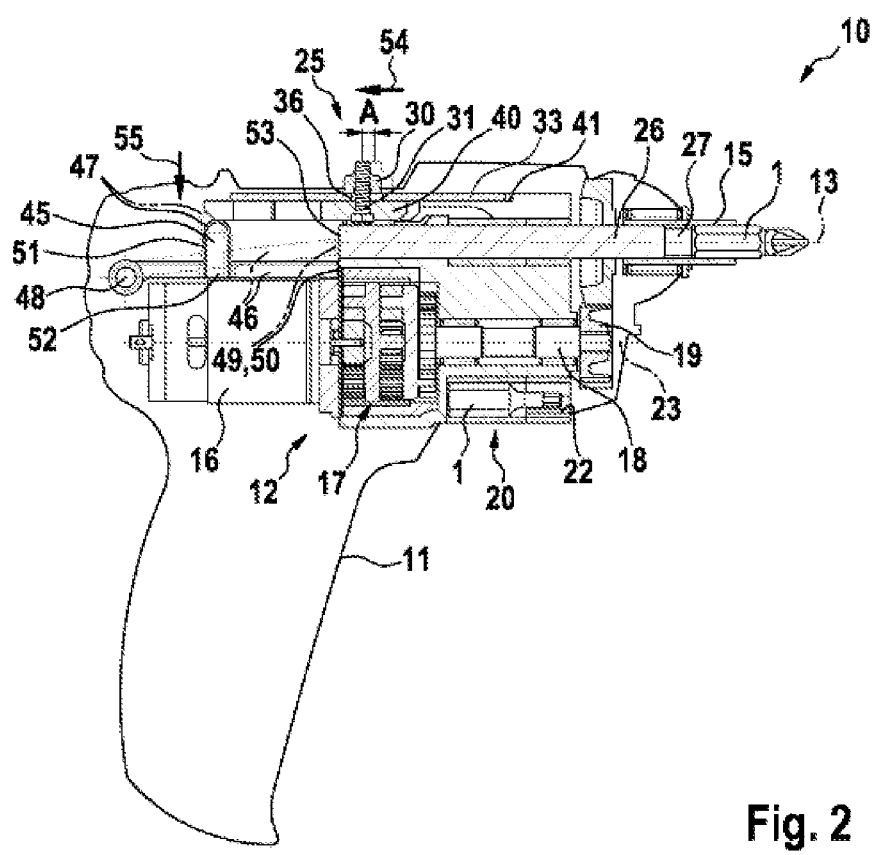
FIG. 2 shows the power tool according to FIG. 1 when a tool change is initiated, likewise in a simplified longitudinal section.
Figure 3:
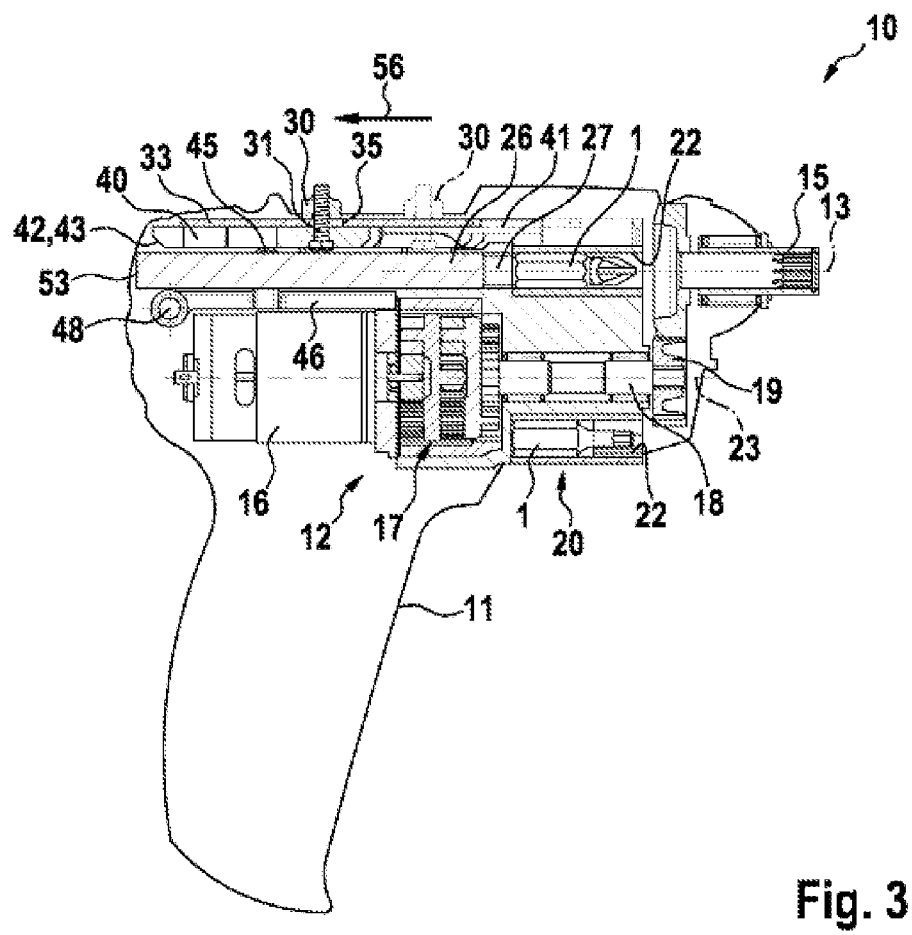
FIG. 3 shows the power tool according to FIGS. 1 and 2 in a position in which a tool can be removed from a tool change magazine and can be re-inserted into the latter, in a simplified longitudinal section.

FIGS. 1 to 3 illustrate a power tool 10 according to the disclosure in the form of a battery-powered screwdriver. The power tool 10 configured as a portable power tool has a pistol-shaped basic form, in the housing 11 of which there is arranged a drive unit 12 for driving or rotating a tool 1 in a tool receptacle 15 having a longitudinal axis 13. To this end, the drive unit 12 comprises a drive motor 16 in the form of an electric motor, which is powered preferably by means of a storage battery (not illustrated). The drive motor 16 is coupled, on the side facing the tool receptacle 15, to a transmission 17, the output shaft 18 of which drives an intermediate transmission 19, which is coupled in turn to the tool receptacle 15.

Arranged in the region of the output shaft 18 is a drum-shaped tool change magazine 20 that projects partially out of the underside of the housing 11 and on the periphery of which tool chambers 22 are arranged, preferably at equal angular intervals, in which in each case one tool 1 is received. The tool chambers 22 are formed in an open manner at their mutually opposite end sides, and the tool change magazine 20 is arranged so as to be rotatable about the rotation axis 23 of the output shaft 18. In order to change a tool into or out of the tool receptacle 15, the tool chambers 22 of the tool change magazine 20 are pivotable into a rotational position in which the relevant tool chamber 22 is aligned with the longitudinal axis 13 of the tool receptacle 15.

A power tool described thus far is known from the applicant's DE 10 2006 059 688 A1, and so for further details on the design, reference is made to said application, which to this extent is intended to be part of the present application.

A tool 1 is transferred from a tool chamber 22 into the tool receptacle 15 and a tool 1 is returned from the tool receptacle 15 into the tool chamber 22 by means of a tool change device 25. The tool change device 25 comprises a pin-shaped slider element 26, of which the end region 27 that faces the tool 1 may be formed in particular in a magnetic manner, wherein the slider element 26 forms a support for the tool 1, in the operating position illustrated in FIG. 1, in order for example to absorb axial screwing forces or pass them into the housing 11. The slider element 26 aligned with the longitudinal axis 13 movable in the direction of the double arrow 28. To this end, the slider element is coupled to an operating element 30 that is arranged on the top side of the housing and is graspable from the outside by an operator, wherein the operating element 30, in the form of a control knob, is likewise movable in the direction of the double arrow 28.

In the direction of the interior of the housing 11, the operating element 30 has a pin-shaped extension 31 which penetrates through a longitudinal slot 32 in a guide plate 33. The longitudinal slot 32 has, in parallel orientation with the longitudinal axis 13, a front end stop 35 and a rear end stop 36, as can be seen from joint consideration of FIGS. 1 and 3. On that side of the guide plate 33 that is opposite the operating element 30, the extension 31 is connected to a, for example pin-shaped, transmission element 40 that acts as an adjusting element and is in turn coupled to the slider element 26 in particular by way of a form-fitting geometry, wherein play is formed between the transmission element 40 and the slider element 26 in the direction of the double arrow 28.

The guide plate 33 is arranged in a displaceable manner, likewise in the direction of the double arrow 28, in a guide 41 (not illustrated in more detail) of the housing 11. The transmission element 40, arranged directly under the guide plate 33, has, on the side opposite the tool receptacle 15, an end region 42 having an obliquely arranged edge 43 that forms a first contact surface. The end region 42 interacts with a pin-shaped switching element 45. The switching element 45 is arranged in an approximately central portion of a pin-shaped blocking element 46 and is connected thereto. The switching element 45 has, on the side facing the end region 42, a rounded dome 47 that forms a second contact surface.

In its end region remote from the tool receptacle 15, the blocking element 46 is mounted in a pivotable manner on a pivot 48 in the housing 11, wherein the pivot 48 is arranged for example axially behind the drive motor 16 and just above the latter. In the operating position, illustrated in FIG. 1, of the power tool 10, the end region 49 opposite the pivot 48 forms, with its end face 50 facing the slider element 26, an abutment or bearing surface for the slider element 26. Furthermore, the switching element 45 has a cutout in the form of an aperture 51, the cross section or the shape of which is matched to the cross section or the shape of the slider element 26 such that the slider element 26 can be guided through the aperture 51 in the transmission element 45.

Arranged preferably on that side of the blocking element 46 that is opposite the switching element 45 is a restoring element in the form of a compression spring 52, which subjects the blocking element 46 to a force in order to move it into a position in which the end side 50 of the blocking element 46 interacts with that side 53 of the slider element 26 that faces the blocking element 46.

FIG. 1 illustrates the one position, the operating position of the power tool 10, in which a tool 1, for example a screw bit, can be rotated via the drive motor 16 and the tool receptacle 15. In this position of the slider element 26, the end side 50 thereof bears against the end side 53 of the slider element 26, and so a pressure force, acting on the tool 1 in the one direction of the double arrow 28 in the direction of the housing 11, is passed from the tool 1 to the slider element 26 and in turn from the latter, via the blocking element 46, to the mounting of the blocking element 46 in the region of the pivot 48 and into the housing 11 of the power tool 10.

In order to start a tool change, in accordance with FIG. 2, the operating element 30 is first of all moved in the direction of the arrow 54 along a displacement path A, which corresponds to the distance between the two end stops 35, 36, this having the result that the transmission element 40 likewise moves in the direction of the arrow 54, while the slider element 26 initially remains in its original position. As a result of the movement of the transmission element 40, the switching element 45 of the blocking element 46 is pushed downward in the direction of the arrow 55 by the edge 43 of the transmission element 40 counter to the spring force of the compression spring 52, such that the end side 50 of the blocking element 46 is taken out of contact with the end side 53 of the slider element 26. In the end state in which the slider element 26 takes up its other (end) position, the blocking element 46 is arranged in a plane beneath the slider element 26. In this state, it is possible to pull the slider element 26, together with the corresponding tool 1, out of the tool receptacle 15 and introduce it into the tool chamber 22. This takes place in that the operating element 30 is moved in the direction of the arrow 56 in a manner corresponding to FIG. 3, with the result that both the transmission element 40 and the slider element 46 are moved away from the tool receptacle 15. What is essential in this case is that, during the movement of the slider element 26, the latter can be guided through the aperture 51 in the transmission element 45.

In the position, illustrated in FIG. 3, of the slider element 26, the tool 1 is arranged within its tool chamber 22. In this position, the tool change magazine can be rotated by the operator by being rotated about the rotation axis 23, in order to align a different tool 1 with the slider element 26. As soon as this has taken place, the tool 1 can be transferred into the tool receptacle 15 by a corresponding movement of the operating element 30 counter to the direction of the arrow 56. In this case, the blocking element 46 is moved by means of the compression spring 52 back into its position blocking the slider element 26, as soon as, in accordance with FIG. 1, the end region 42 of the transmission element 40 has been moved past the switching element 45.

The power tool 10 described thus far can be modified in many ways without departing from the scope of the disclosure. In particular, the use of the power tool 10 is not limited to a battery-powered screwdriver, and the configuration of the operating element 30, of the blocking element 46 and of the transmission element 40 and the actuation of the latter via the actuating element 30 can be formed in a manner structurally different from the embodiment illustrated.

The invention claimed is:

1. A motor-powered power tool, comprising:
a drive unit;
a tool change magazine having tool chambers, each of the tool chambers being adjustable into a position configured to transfer a respective tool to a tool receptacle to be equipped; and
a tool change device having a slider element, the slider element being:
(i) arranged in operative connection with one of the respective tools,
(ii) aligned with a drive axis of the tool receptacle,
(iii) adjustable by an operating element into a first slider element position, the first slider element position being a non-operating position of the slider element in which the one of the respective tools is receivable and transferable from and into the associated tool chamber, and
(iv) adjustable into a second slider element position, the second slider element position being an operating position of the slider element in which the one of the respective tools is drivable by the tool receptacle,
wherein:
the slider element is fixable in the second slider element position by a blocking element, the blocking element being adjustable into a first blocking element position and a second blocking element position by a transmission element, wherein in the first blocking element position the blocking element is operatively disconnected from the slider element and in the second blocking element position the blocking element is operatively connected to the slider element; and
the slider element is arranged in at least indirect contact with the blocking element in order to adjust the blocking element by the transmission element such that, when the slider element is moved from the second slider element position into the first slider element position by the transmission element, the blocking element is moved from the second blocking element position to the first blocking element position by the transmission element.

2. The power tool as claimed in claim 1, wherein the blocking element has an end region, and when the blocking element is arranged in the second blocking element position, the end region is in contact with the slider element when the slider element in the second slider element position.

3. The power tool as claimed in claim 2, wherein, in order to adjust the slider element from the second slider element position into the first slider element position and vice versa, the blocking element is arranged so as to be changeable in position, such that in response to the slider element being arranged in the first slider element position, the blocking element is arranged in the first blocking element position and at least the end region of the blocking element is arranged in a plane below the slider element such that the end region of the blocking element is no longer in contact with the slider element.

4. The power tool as claimed in claim 2, wherein the end region of the blocking element is in contact with an end side of the slider element as the slider element is in the second slider element position.

5. The power tool as claimed in claim 1, wherein the blocking element has a pin-shaped region configured to lock the slider element.

6. The power tool as claimed in claim 5, wherein the pin-shaped region of the blocking element is oriented parallel to the slider element as the slider element is configured in the first slider element position such that the slider element is arranged alongside the pin-shaped region of the blocking element.

7. The power tool as claimed in claim 5, wherein:
an end region of the transmission element interacts with a switching element arranged on the blocking element in order to adjust the blocking element; and
the end region of the transmission element and the switching element have mutually facing contact surfaces that interact with one another and are arranged obliquely with respect to the drive axis of the tool receptacle, and when moving past one another, produce a force on the blocking element, the force affecting an adjustment of the blocking element from the second blocking element position into the first blocking element position and vice versa.

8. The power tool as claimed in claim 7, wherein; with respect to a length of the pin-shaped blocking element, the switching element is arranged in an approximately central region of the pin-shaped blocking element, the switching element enabling the mutually facing contact surfaces of the transmission element and the switching element to interact with each other; and the switching element has a cutout through which the slider element is guidable as it the slider element moves between the first and second slider element positions.

9. The power tool as claimed in claim 8, wherein the cutout is configured in the form of an aperture.

10. The power tool as claimed in claim 7, wherein an end side of the slider element is located between the end region of the transmission element and the tool receptacle as the slider element is in the second slider element position.

11. The power tool as claimed in claim 5, wherein the blocking element with the pin-shaped region is arranged in a pivotable manner on a pivot, wherein the pivot is disposed on a side opposite an end region of the blocking element.

12. The power tool as claimed in claim 1, wherein the operating element is arranged in a longitudinally displaceable manner in a direction parallel to the drive axis of the tool receptacle, the operating element including the transmission element configured to interact at least indirectly with the blocking element.

13. The power tool as claimed in claim 1, wherein the blocking element interacts in operative connection with a restoring element that subjects the blocking element to a force in order to move the blocking element towards the second blocking element position.

14. The power tool as claimed in claim 13, wherein the restoring element is configured in the form of a compression spring.

15. The power tool as claimed in claim 1, wherein:
the operating element is arranged in a guide plate that has a longitudinal slot having two end stops; and
the operating element is movable within the two end stops along a displacement path in order to adjust the blocking element from the first blocking element position into the second blocking element position and vice versa.

16. The power tool as claimed in claim 1, wherein the power tool is configured as a portable power tool for driving the one of the respective tools in rotation.

17. A motor-powered power tool, comprising:
a drive unit;
a tool change magazine having tool chambers, each of the tool chambers being adjustable into a position configured to transfer a respective tool to a tool receptacle to be equipped; and
a tool change device having a slider element, the slider element being:
(i) arranged in operative connection with one of the respective tools,
(ii) aligned with a drive axis of the tool receptacle,
(iii) adjustable by an operating element into a first slider element position, the first slider element position being a non-operating position of the slider element in which the one of the respective tools is receivable and transferable from and into the associated tool chamber, and
(iv) adjustable into a second slider element position, the second slider element position being an operating position of the slider element in which the one of the respective tools is drivable by the tool receptacle, wherein:

the slider element is fixable in the second slider element position by a blocking element, the blocking element being adjustable into a first blocking element position and a second blocking element position by a transmission element, wherein in the first blocking element position the blocking element is operatively disconnected from the slider element and in the second blocking element position the blocking element is operatively connected to the slider element;

the slider element is arranged in at least indirect contact with the blocking element in order to adjust the blocking element by the transmission element such that, when the slider element is moved from the second slider element position into the first slider element position by the transmission element, the blocking element is moved from the second blocking element position to the first blocking element position by the transmission element;

the blocking element has a pin-shaped region configured to lock the slider element;

an end region of the transmission element interacts with a switching element arranged on the blocking element in order to adjust the blocking element; and the end region of the transmission element and the switching element have mutually facing contact surfaces that interact with one another and are arranged obliquely with respect to the drive axis of the tool receptacle, and when moving past one another, produce a force on the blocking element from the second blocking element position into the first blocking element position and vice versa.

18. A motor-powered power tool, comprising:
a drive unit;
a tool change magazine having tool chambers, each of the tool chambers being adjustable into a position configured to transfer a respective tool to a tool receptacle to be equipped; and
a tool change device having a slider element, the slider element being:
(i) arranged in operative connection with one of the respective tools,
(ii) aligned with a drive axis of the tool receptacle,
(iii) adjustable by an operating element into a first slider element position, the first slider element position being a non-operating position of the slider element in which the one of the respective tools is receivable and transferable from and into the associated tool chamber, and
(iv) adjustable into a second slider element position, the second slider element position being an operating position of the slider element in which the one of the respective tools is drivable by the tool receptacle;
an operating element graspable by an operator, the operating element being coupled to the slider element and configured to move the slider element from the second slider element position into the first slider element position in response to the operating element being moved by the operator in a first direction;
a blocking element movable between a second blocking element position at which the blocking element blocks movement of the slider element from the second slider element position toward the first slider element position and a first blocking element position at which the slider element is allowed to move from the second slider element position toward the first slider element position;

a transmission element operatively connected to the operating element and configured to move with the operating element in the first direction, wherein movement of the transmission element in the first direction causes the transmission element to engage the blocking element and move the blocking element from the second blocking element position into the first blocking element position.

\* \* \* \* \*